3,098,856
THIAMINE DISULFIDE DERIVATIVES OF OCTA-
  NOIC ACID AND THEIR PREPARATION
Masao Ohara, Ibaraki, Kiyotsugu Yamamoto, Osaka, and
  Yoshio Deguchi, Suita, Japan, assignors to Fujisawa
  Pharmaceutical Co., Ltd., Osaka, Japan, a corporation
  of Japan
No Drawing. Filed Aug. 14, 1961, Ser. No. 131,081
  Claims priority, application Japan Aug. 19, 1960
          10 Claims. (Cl. 260—256.5)

This invention relates to novel and useful medicines. More particularly, this invention is concerned with disulfide compounds of octanoic acid derivatives with vitamin $B_1$ or its O-substituted compounds, or the non-toxic acid addition salts thereof, and with processes for preparing these compounds.

The disulfide compounds of this invention have one of the following general formulas:

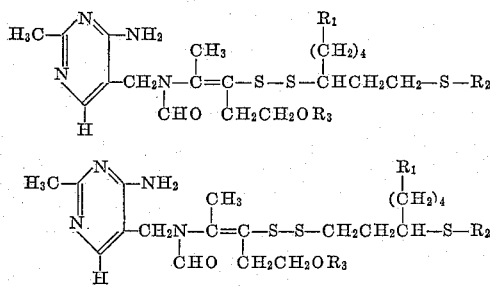

wherein $R_1$ is carboxyl radical or a radical capable of producing carboxyl radical on hydrolysis, $R_2$ is an acyl radical, $R_3$ is hydrogen, an acyl radical or a residue of a phosphorus-containing inorganic acid such as phosphoric acid or pyrophosphoric acid.

It is an object of this invention to provide novel compounds having great worth medically. It is also an object to provide processes for preparing same. Further objects will appear hereinafter.

The compounds of the present invention consist of the combination of two previously known moieties, thioctic acid or its derivative and vitamin $B_1$ or its derivative. However, the new compounds differ essentially from a mixture of the two moieties by their excellence in many aspects:

The vitamin $B_1$ component of this novel compound is quite rapidly and favourably absorbed by the intestinal tract, without decomposition by aneurinase (vitamin $B_1$ decomposing enzyme), and in increased amount proportionately to the doses ingested. The $B_1$ components, with a strong affinity to the tissues, are transferred to the blood-corpuscle and the various internal organs as well, and retained in the living body at high concentrations for a prolonged time. Further, they are rather easily converted in the body into cocarboxylase.

The thioctic acid component of the novel compounds also shows better absorption than thioctic acid or its derivative as such. The novel compounds are generally low in toxicity.

Thioctic acid and vitamin $B_1$ are commonly used in combination, but it cannot be expected that these two components may be effective in a mixed solution for injection, because thioctic acid is stable only in an alkaline medium and vitamin $B_1$ in an acid medium. The present invention combining both moieties chemically permits the administration of both active agents in an injectable form, which is convenient, effective and efficient. The new compounds may be mixed with non-toxic, pharmaceutically-acceptable carriers for injection or oral doses.

The process of this invention comprises reacting a 8- or 6-acylthiooctanoic acid or a functional derivative thereof having an active sulfur-containing radical at 6- or 8-position, having any of the general formulas:

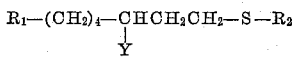

or

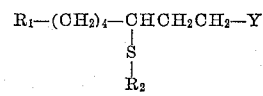

wherein Y is an active sulfur-containing radical, and $R_1$ and $R_2$ are the same as described above, with the thiol form of vitamin $B_1$ or an O-derivative thereof having the general formula:

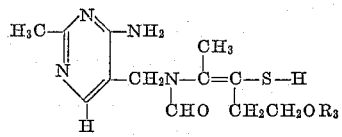

wherein $R_3$ is the same as described above, and if desired, treating the resulting disulfide compound (I) or (II) with an acid to produce its non-toxic acid addition salt.

The active sulfur-containing radicals of this invention include all the radicals generally known in the art which form a disulfide bond by reaction with the mercapto radical in the thiol form of vitamin $B_1$ or a derivative thereof, such as a thio-alkali metal sulfo (—$S_2O_3$Me; Me: alkali metal), thio-ammonium sulfo (—$S_2O_3NH_4$), thio-thiocyano (—S—SCN), thiocyano (—SCN), a halogeno-thio (—SX; X: halogen), an aliphatic or aromatic sulfonylthio (—S—$SO_2$R; R: organic radical), a sulfinylthio (—S—SO—), mercapto radical and so forth.

A few examples of the organic sulfonylthio radical are methane-sulfonylthio, ethane-sulfonylthio, benzene-sulfonylthio, toluene-sulfonylthio, and so forth.

The radicals capable of producing carboxyl radical on hydrolysis include esters and amides of carboxylic acid.

The octanoic acid derivatives having an active sulfur-containing radical (III) or (IV), are easily prepared by usual methods: e.g., an 8- or 6-acylthiooctanoic acid derivative having a thio-alkali metal sulfo radical at 6- or 8-position may be obtained by the reaction of a 6- or 8-halogeno (preferably iodo)-8- or 6-acylthiooctanoic acid derivative with an alkali metal thiosulfate in an aqueous solution under heating, and an octanoic acid derivative having an organic sulfonylthio radical at 6- or 8-position may also be obtained by reacting an octanoic acid derivative having a halogeno radical at 6- or 8-position with an alkali metal thio organic sulfonate or an equivalent thereof.

The solution of the octanoic acid derivative (III) or (IV) thus obtained may be used directly in the process of this invention without isolation.

In a solution of vitamin $B_1$ or an O-derivative thereof, the ammonium form and thiol form are in equilibration, and the equilibration is changeable according to the pH; the thiol form increases in an alkaline solution and the ammonium form in an acidic solution. It is preferred therefore to effect the reaction in neutral or alkaline solution.

In the reaction any solvent such as water, an aqueous organic solvent, a lower fatty alcohol, a lower fatty ether and so forth, may be used in compliance with the solubility of raw materials in this invention.

The reaction proceeds sufficiently at room temperature but may be carried out under warming as well, and ordinarily is completed within a short time.

If an active sulfur-containing radical of the compound (III) or (IV) is mercapto, it is preferred to effect the reaction in the presence of an oxidizing agent such as iodine.

Since the disulfide compounds obtained are generally insoluble in water, it is preferred to isolate them by extraction with an organic solvent such as ether, ethyl acetate, benzene and so forth.

The disulfide compound in the form of the free base thus obtained may be readily conducted to its non-toxic acid addition salt according to the methods known in the art. A few preferable examples of the acids used are a hydrohalogenic acid, an aliphatic or aromatic sulfonic acid, and so forth.

The following examples illustrate the present invention without, however, limiting the same thereto.

Example 1

15.0 g. of methyl 6-bromo-8-acetylthio-octanoate are dissolved in 100 cc. of ethanol and a solution of 15.0 g. of sodium thiosulfate ($5H_2O$) in 35 cc. of water is added and the mixture heated under reflux for six hours. The ethanol is removed under reduced pressure and the isoluble portion remaining is removed by extraction with ether to obtain an aqueous solution of sodium 1-acetylthio-7-methoxy-carbonylheptane-3-thiosulfate.

To a solution of 8.5 g. of vitamin $B_1$ hydrochloride in 50 cc. of water, adjusting pH to about 11 with caustic soda, is added the said aqueous solution at room temperature to immediately produce an oil. The oil is extracted with ethyl acetate and the extract is shaken with dilute hydrochloric acid and the separated aqueous solution is neutralized with potassium carbonate and the precipitate obtained is again extracted with ethyl acetate.

The extract is washed with water and dried, and the solvent is removed. The residue is dissolved in absolute ethanol and dry hydrogen chloride gas is introduced into the solution. After adding ether, the solution is allowed to stand to produce crystals of 1-acetylthio-7-methoxycarbonylheptane - 3 - [2 - N - (4 - amino - 2 - methyl - 5 - pyrimidinyl) methylformamino-1-(2-hydroxyethyl) propenyl] disulfide hydrochloride, which is recrystallized from a mixture of absolute ethanol and ether to obtain colorless needles of M.P. 146–149° C.

This is negative on thiochrome reaction but by addition of cysteine the reaction changes to positive.

U.V.: $\lambda_{max}^{C_2H_5OH}$ 234 m$\mu$

I.R.: 3280, 1735, 1690, 1650 cm.$^{-1}$

*Analysis.*—Calculated for $C_{23}H_{37}O_5N_4S_3Cl$: C, 47.53; H, 6.42; N, 9.64; S, 16.55; Cl, 6.10. Found: C, 47.52; H, 6.69; N, 9.51; S, 16.21; Cl, 6.35.

Example 2

7.6 g. of potassium hydroxide are dissolved in 160 cc. of ethanol. One-half of this solution is then saturated with hydrogen sulfide and then added to the remaining half. A solution of 10.8 g. of p-toluene sulfonyl chloride in 180 cc. of ethanol is added drop by drop to the above solution under cooling, and further 10.0 g. of methyl 6-bromo-8-acetylthiooctanoate are added to the solution. The mixture is stirred under heating for one hour and a half. After the solution is cooled, the precipitate produced is filtered off and the ethanol removed. The residue is extracted with ether, washed with water and the ether removed to obtain 1-acetylthio-7-methoxycarbonylheptane-3-p-toluene thiosulfonate, which is dissolved in 100 cc. of ethanol.

To a solution of 5 g. of vitamin $B_1$ hydrochloride in 50 cc. of water is added at room temperature the solution thus prepared while keeping it alkaline with caustic soda and the solution is allowed to stand for two hours. The ethanol is removed under reduced pressure and the oil produced is extracted with ethyl acetate. The extract is treated according to the method of Example 1 to produce a product of M.P. 142–145° C., which shows no depression of melting point on admixture with the product of Example 1.

Example 3

A solution of 15.0 g. of methyl 6-chloro-8-acetylthio-octanoate in 120 cc. of ethanol is added to a solution of 18.0 g. of sodium thiosulfate ($5H_2O$) in 50 cc. of water and the mixture is heated under reflux for twenty hours. The ethanol is removed under reduced pressure and the precipitate is removed by extraction with ether to obtain an aqueous solution of sodium 1-acetylthio-7-methoxycarbonylheptane-3-thiosulfate.

To a solution of 6.4 g. of vitamin $B_1$ hydrochloride in 30 cc. of water, adjusting pH to about 11 with caustic soda solution, is added the solution prepared as above at room temperature to precipitate oil immediately, which is extracted with ethyl acetate. The extract is treated according to the method of Example 1 to produce a product of M.P. 144–147° C., which shows no depression of melting point on admixture with the product of Example 1.

Example 4

To a solution of 42.1 g. of sodium iodide in 450 cc. of acetone are added 15.0 g. of methyl 6-chloro-8-acetylthiooctanoate and the solution is heated under reflux for about fifty hours. The acetone is removed, water added, and the solution is extracted with benzene. The extract is washed with an aqueous solution of sodium bisulfite and dried. The solvent is removed to produce 15.8 g. of methyl 6-iodo-8-acetylthiooctanoate. To the solution of this compound in 120 cc. of ethanol is added a solution of 15.3 g. of sodium thiosulfate ($5H_2O$) in 45 cc. of water and the mixture refluxed for six hours. The ethanol is removed under reduced pressure and the precipitate is removed by extraction with ether to obtain an aqueous solution of sodium 1-acetylthio-7-methoxycarbonylheptane-3-thiosulfate.

To a solution of 9.3 g. of vitamin $B_1$ hydrochloride in 50 cc. of water, adjusting pH to about 11 with caustic soda, is added the solution prepared as above at room temperature to precipitate oil immediately, which is extracted with ethyl acetate. The extract is treated according to the method of Example 1 to produce the product of M.P. 145–148° C., which shows no depression of melting point on admixture of the product of Example 1.

Example 5

To a solution of 15.0 g. of methyl 6-acetylthio-8-chlorooctanoate in 100 cc. of ethanol is added a solution of 15.0 g. of sodium thiosulfate ($5H_2O$) in 35 cc. of water and the mixture is refluxed for nine hours. The mixture is treated as in Example 1 to obtain an aqueous solution of sodium 3-acetylthio-7-methoxycarbonylheptane-1-thiosulfate.

To a solution of 8.5 g. of vitamin $B_1$ hydrochloride in 50 cc. of water, adjusting pH to about 11 with caustic soda, is added the solution prepared as above at room temperature to precipitate oil immediately, which is extracted with ethyl acetate. The extract is treated as in Example 1 to produce 3-acetylthio-7-methoxycarbonylheptane-1-[2-N-(4-amino - 2 - methyl-5-pyrimidinyl) methylformamino-1-(2-hydroxyethyl) propenyl] disulfide hydrochloride, which is recrystallized from a mixture of absolute ethanol and ether to obtain needles of M.P. 134–135° C.

This is negative on thiochrome reaction but by addition of cysteine the reaction changes to positive.

*Analysis.*—Calculated for $C_{23}H_{37}O_5N_4S_3Cl$: C, 47.53; H, 6.42; N, 9.64; S, 16.55; Cl, 6.10. Found: C, 47.78; H, 6.69; N, 9.40; S, 16.14; Cl, 6.53.

Example 6

53.0 g. of sodium iodide are dissolved in 600 cc. of acetone and to the solution are added 47.0 g. of methyl 8-chloro-6-acetylthiooctanoate and the solution is treated as in Example 4 to produce 59.3 g. of methyl 8-iodo-6-acetylthiooctanoate. 50.0 g. of the compound are dissolved in 400 cc. of ethanol and to the solution is added a solution of 50.0 g. of sodium thiosulfate ($5H_2O$) in 100 cc. of water. The mixture is refluxed for three hours and then treated as in Example 4 to obtain an aqueous solution of sodium 3-acetylthio - 7 - methoxycarbonylheptane-1-thiosulfate.

To a solution of 44.0 g. of vitamin $B_1$ hydrochloride in 140 cc. of water is added slowly under cooling a solution of 15.7 g. of caustic soda in 60 cc. of water and the mixture is allowed to stand for about thirty minutes. The solution produced is added drop by drop to the said aqueous solution to precipitate oil immediately.

This is extracted with ethyl acetate and the extract is shaken with dilute hydrochloric acid. The aqueous solution obtained is neutralized with sodium carbonate and the precipitate is again extracted with ethyl acetate. The extract is washed with water and dried, and the solvent is removed to produce about 55.0 g. of crude 3-acetylthio-7-methoxycarbonylheptane-1-[2-N-(4-amino - 2 - methyl-5-pyrimidinyl) methylformamino-1-(2-hydroxyethyl) propenyl] disulfide, a part of which is recrystallized from a mixture of ethanol and ether to produce crystals of M.P. 106–109° C.

U.V.: $\lambda_{max}^{95\% \ C_2H_5OH}$ 234 m$\mu$ ($\epsilon$ 16,200), 277–8 m$\mu$ ($\epsilon$ 5,820)

*Analysis.*—Calculated for $C_{23}H_{36}O_5S_3N_4$: C, 50.71; H, 6.66; N, 10.29; S, 17.66. Found: C, 50.71; H, 6.76; N, 10.26; S, 17.22.

Another part of the crude product mentioned above is dissolved in ethanol. After dry hydrogen chloride gas is introduced into the solution, ether is added, and the solution is allowed to stand to produce hydrochloride of same. This is recrystallized from a mixture of absolute ethanol and ether to give a product having a M.P. of 134.5–135° C. Both the free base and the salt obtained in above are negative on thiochrome reaction but by addition of cysteine they change to positive.

U.V.: $\lambda_{max}^{95\% \ C_2H_5OH}$ 234 m$\mu$ ($\epsilon$ 16,900)

*Analysis.*—Calculated for $C_{23}H_{37}O_5S_3N_4Cl$: C, 47.53; H, 6.42; N, 9.64; S, 16.55; Cl, 6.10. Found: C, 47.44; H, 6.38; N, 9.37; S, 16.30; Cl, 6.42.

*Example 7*

To a solution of 6.0 g. of methyl 8-acetylthio-6-thiocyanooctanoate in 150 cc. of ethanol is added a solution of 7.0 g. of vitamin $B_1$ hydrochloride in 60 cc. of water. 25 cc. of 10% caustic soda solution are added drop by drop to the solution at a pH not exceeding 12 and below room temperature. After treating for two hours at room temperature and for one hour at 40–50° C., the mixture is neutralized with dilute mineral acid to pH 7.4. The ethanol is removed and the residue is extracted with ethyl acetate. The extract is shaken with dilute hydrochloric acid and treated as in Example 1 to produce the same compound of Example 1 of M.P. 139–143° C.

*Example 8*

To a suspension of 8.8 g. of methyl 8-acetylthio-6-mercaptooctanoate, 13 cc. of 10% caustic soda solution and 80 cc. of water is added a solution of 11.2 g. of vitamin $B_1$ hydrochloride, 36 cc. of 10% caustic soda solution and 400 cc. of water. A 10% iodine-potassium iodide solution is dropped under stirring to the solution to the extent that the solution is colored constantly by same.

The solution is extracted with ethyl acetate and the extract is washed with aqueous solution of sodium bisulfite, and with water, shaken with dilute hydrochloric acid and treated as in Example 1 to produce the same compound as Example 1 of M.P. 141–145° C.

*Example 9*

To a solution of 16.7 g. of dimethyl 6,6'-dithiobis (8-acetylthiooctanoate) in 40 cc. of glacial acetic acid are added under cooling 4.5 g. of 30% hydrogen peroxide solution, and after cooling for one hour the solution is allowed to stand overnight. After adding cold water the solution is neutralized with sodium carbonate to isolate oil which is extracted with chloroform. The extract is washed with water and dried and the chloroform is removed to obtain 15.0 g. of crude 3,3'-thiosulfinylbis (1-acetylthio-7-methoxycarbonylheptane).

To 9.0 g. of this compound in 100 cc. of ethanol is added a solution of 5.6 g. of vitamin $B_1$ hydrochloride in 30 cc. of water. A 10% caustic soda solution is dropped in the solution to maintain the pH at 8.4 constantly and then the mixture is allowed to stand overnight. After removing ethanol and adding water, the mixture is extracted with ethyl acetate. The extract is shaken with dilute hydrochloric acid and then treated as in Example 1 to obtain the same compound as Example 1 of M.P. 142–146° C.

*Example 10*

Twelve point zero g. of dimethyl 8,8'-dithiobis (6-acetylthiooctanoate) is oxidized with 3.1 g. of 30% hydrogen peroxide solution in glacial acetic acid as in Example 9 to obtain 11.5 g. of crude 1,1'-thiosulfinylbis (3-acetylthio-7-methoxycarbonylheptane).

To 11.5 g. of this product in 200 cc. of 50% ethanol is added a solution of 8.0 g. of vitamin $B_1$ hydrochloride in 70 cc. of water.

The mixture is treated as in Example 1 to obtain the same compound of Example 5 of M.P. 126–132° C.

*Example 11*

Fifteen point zero g. of methyl 8-benzoylthio-6-bromooctanoate in 170 cc. of ethanol are added to 15.0 g. of sodium thiosulfate ($5H_2O$) in 45 cc. of water, and the solution is treated as in Example 5 to obtain an aqueous solution of sodium 1-benzoylthio-7-methoxycarbonylheptane-3-thiosulfate.

A solution of 2.0 g. of sodium hydroxide in 20 cc. of water is added drop by drop under cooling to a solution of 5.9 g. of vitamin $B_1$ hydrochloride in 20 cc. of water, and the solution is allowed to stand for about thirty minutes. The solution and the aqueous solution obtained above are treated as in Example 1 to obtain 1-benzoylthio-7 - methoxycarbonylheptane - 3 - [2 - N - (4 - amino - 2-methyl - 5 - pyrimidinyl) methylformamino - 1 - (2 - hydroxyethyl) propenyl] disulfide hydrochloride of M.P. 127–129° C.

U.V.: $\lambda_{max}^{90\% \ C_2H_5OH}$ 233 m$\mu$ ($\epsilon$ 23,000)

*Analysis.*—Calculated for $C_{28}H_{39}O_5N_4S_3Cl$: C, 52.28; H, 6.11; N, 8.71; S, 14.95; Cl, 5.51. Found: C, 52.24; H, 6.37; N, 8.93; S, 14.65; Cl, 5.87.

*Example 12*

To a solution of 6.0 g. of O-acetylthiamine hydrochloride in 25 cc. of water is added slowly under cooling a solution of 1.95 g. of sodium hydroxide in 10 cc. of water and the solution is allowed to stand for about thirty minutes. The solution is treated with an aqueous solution of sodium 3-acetylthio-7-methoxycarbonylheptane-1-thiosulfate prepared as in Example 6 from 6.0 g. of methyl 8-iodo-6-acetylthiooctanoate, according to the method of Example 1 to obtain 3-acetylthio-7-methoxycarbonylheptane - 1 - [2-N-(4 - amino - 2 - methyl - 5 - pyrimidinyl) methylformamino - 1 - (2 - acetoxyethyl) propenyl] disulfide hydrochloride of M.P. 113–115° C.

*Analysis.*—Calculated for $C_{25}H_{39}O_6N_4S_3Cl$: C, 48.18; H, 6.31; N, 8.99; S, 15.44; Cl, 5.69. Found: C, 48.04; H, 6.54; N, 9.27; S, 15.31; Cl, 5.98.

*Example 13*

To a solution of 6.8 g. of vitamin $B_1$ hydrochloride in 20 cc. of water is added slowly under cooling a solution of 2.4 g. of sodium hydroxide in 15 cc. of water and the solution is allowed to stand for about thirty minutes. To an aqueous solution of sodium 3-benzoylthio-7-methoxycarbonylheptane - 1 - thiosulfate prepared from 10.0 g. of methyl-8-iodo-6-benzoylthiooctanoate according to the method of Example 4, the solution prepared as above is added drop by drop and treated as in Example 1 to obtain 3 - benzoylthio - 7 - methoxycarbonylheptane - 1 - [2 - N - (4 - amino - 2 - methyl - 5 - pyrimidinyl) methylformamino - 1 - (2 - hydroxyethyl) propenyl] disulfide hydrochloride of M.P. 120° C. and yield of 4.2 g.

*Analysis.*—Calculated for $C_{28}H_{39}O_5N_4S_3Cl$: C, 52.28; H, 6.11; N, 8.71; S, 14.95; Cl, 5.51. Found: C, 52.04; H, 6.46; N, 8.69; S, 14.90; Cl, 5.54.

Example 14

Thirty-nine point zero g. of 6-chloro-8-acetylthiooctanoic acid amide are treated with 71.0 g. of sodium iodide as in Example 4 to obtain 46.0 g. of 6-iodo-8-acetylthiooctanoic acid amide. Thirty point zero g. of this compound are treated as in Example 4 to obtain an aqueous solution of sodium 1-acetylthio-7-aminocarbonylheptane-3-thiosulfate.

A solution prepared from 21.7 g. of vitamin $B_1$ hydrochloride in 20 cc. of water and 7.7 g. of sodium hydroxide in 70 cc. of water as in Example 13 is added drop by drop to the aqueous solution prepared above, and treated as in Example 1 to obtain 1-acetylthio-7-aminocarbonylheptane - 3 - [2 - N - (4 -amino - 2 -methyl - 5 - pyrimidinyl) methylformamino-1-(2-hydroxyethyl) propenyl] disulfide hydrochloride of M.P. 108° (decomposition).

*Analysis.*—Calculated for $C_{22}H_{36}O_4N_5S_3Cl$: C, 46.64; H, 6.36; N, 12.36; S, 16.97; Cl, 6.27. Found: C, 46.86; H, 6.34; N, 12.19; S, 16.39; Cl, 6.81.

Example 15

To a solution of 6.4 g. of vitamin $B_1$ hydrochloride in 10 cc. of water is added slowly under cooling a solution of 2.3 g. of sodium hydroxide in 20 cc. of water and the solution is allowed to stand for about thirty minutes. The solution is treated with an aqueous solution of sodium 1 - acetylthio - 7 - carboxylheptane - 3 - thiosulfate prepared as in Example 6 from 16.2 g. of 6-iodo-8-acetylthiooctanoic acid, according to the method of Example 1 to obtain 1-acetylthio-7-carboxylheptane-3-[2-N-(4-amino-2-methyl - 5 - pyrimidinyl) methylformamino - 1 - (2 - hydroxyethyl) propenyl] disulfide hydrochloride of M.P. 102° C. (decomposition).

*Analysis.*—Calculated for $C_{22}H_{35}O_5N_4S_3Cl$: C, 46.60; H, 6.18; N, 9.89; S, 16.94; Cl, 6.27. Found: C, 46.60; H, 6.48; N, 10.13; S, 16.29; Cl, 6.74.

We claim:
1. A compound of the formula selected from the group consisting of:

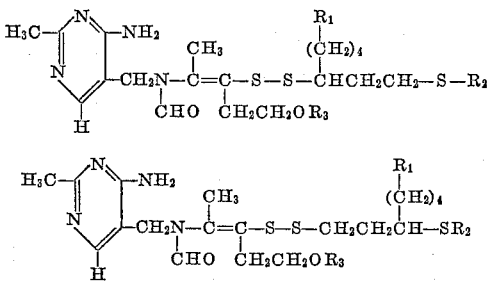

and non-toxic acid addition salts thereof wherein $R_1$ is selected from the group consisting of carboxyl, carbo-lower-alkoxy and carboxamide, $R_2$ is selected from the group consisting of lower alkanoyl and benzoyl, and $R_3$ is selected from the group consisting of hydrogen, lower alkanoyl, benzoyl and pyrophosphate.

2. A pharmaceutical composition comprising a compound of claim 1 and a non-toxic, pharmaceutically-acceptable carrier.

3. A member of the group consisting of 1-$R_4$ thio-7-$R_5$ heptane - 3 - [2 - N - (4 - amino - 2 - methyl - 5 - pyrimidinyl) methyl-formamino-1-(2-hydroxyethyl) propenyl] disulfides and the hydrochlorides thereof wherein $R_4$ is selected from the group consisting of acetyl and benzoyl and $R_5$ is selected from the group consisting of methoxycarbonyl, aminocarbonyl and carboxyl.

4. A member of the group consisting of 3-$R_6$ thio-7-methoxycarbonylheptane - 1 -[2 - N - (4 - amino - 2-methyl-5-pyrimidinyl) methyl-formamino-1-(2-$R_7$ ethyl) propenyl] disulfides and the hydrochlorides thereof wherein $R_6$ is selected from the group consisting of acetyl and benzoyl and $R_7$ is selected from the group consisting of hydroxy and acetoxy.

5. 3 - acetylthio - 7 - methoxycarbonylheptane - 1 - [2-N - (4 - amino - 2 - methyl - 5 - pyrimidinyl) methylformamino-1-(2-hydroxyethyl) propenyl] disulfide.

6. 3 - acetylthio - 7 - methoxycarbonylheptane - 1 - [2-N - (4 - amino - 2-methyl - 5 - pyrimidinyl) methylformamino-1-(2-hydroxyethyl) propenyl] disulfide hydrochloride.

7. A process which comprises reacting in an alkaline medium an acylthiooctanoic acid derivative selected from the group consisting of:

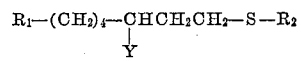

and

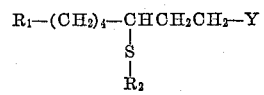

wherein Y is a chemically active sulfur-containing radical, $R_1$ is selected from the group consisting of carboxyl, carbo-lower-alkoxy and carboxamide, $R_2$ is selected from the group consisting of lower alkanoyl and benzoyl, with the thiol form of vitamin $B_1$ having the general formula:

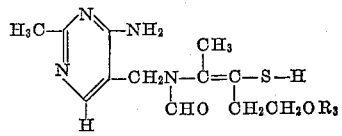

wherein $R_3$ is selected from the group consisting of hydrogen, lower alkanoyl, benzoyl and pyrophosphate.

8. The process of claim 7 additionally comprising treating the resultant reaction product with an acid to produce a non-toxic acid addition salt thereof.

9. A process which comprises reacting in an alkaline medium sodium 3-acetylthio-7-methoxycarbonylheptane-1-thiosulfate with the thiol form of vitamin $B_1$ having the formula:

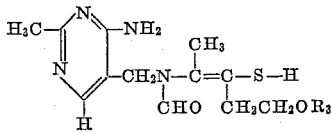

wherein $R_3$ is selected from the group consisting of hydrogen, lower alkanoyl, benzoyl and pyrophosphate.

10. The process of claim 9 wherein said sodium 3-acetylthio - 7 - methoxycarbonylheptane - 1 - thiosulfate is formed by reacting sodium thiosulfate with methyl 6-acetylthio-8-halooctanoate in aqueous solution and reacted with said vitamin $B_1$ within said solution.

References Cited in the file of this patent
UNITED STATES PATENTS
2,833,768    Fujiwara et al. _____ May 6, 1958